United States Patent
Jan et al.

(10) Patent No.: US 8,458,414 B2
(45) Date of Patent: Jun. 4, 2013

(54) ACCESSING MEMORY WITH IDENTICAL INSTRUCTION TYPES AND CENTRAL PROCESSING UNIT THEREOF

(75) Inventors: Sheng-Yuan Jan, Chiayi (TW); Yen-Ju Lu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 370 days.

(21) Appl. No.: 12/756,341

(22) Filed: Apr. 8, 2010

(65) Prior Publication Data

US 2010/0262789 A1 Oct. 14, 2010

(30) Foreign Application Priority Data

Apr. 13, 2009 (TW) .............................. 98112237 A

(51) Int. Cl.
*G06F 9/312* (2006.01)
*G06F 12/04* (2006.01)

(52) U.S. Cl.
USPC ................. 711/154; 711/E12.015; 712/206; 712/226

(58) Field of Classification Search
USPC ............ 711/154, 212, 214, E12.015; 712/26, 712/206, 226
See application file for complete search history.

(56) References Cited

U.S. PATENT DOCUMENTS

| | | | | |
|---|---|---|---|---|
| 6,499,085 | B2 * | 12/2002 | Bogin et al. .................. | 711/118 |
| 6,571,319 | B2 * | 5/2003 | Tremblay et al. ............. | 711/140 |
| 6,574,724 | B1 * | 6/2003 | Hoyle et al. .................. | 711/220 |
| 6,598,140 | B1 * | 7/2003 | McAllister et al. ........... | 711/168 |
| 7,945,760 | B1 * | 5/2011 | Barry et al. .................. | 711/202 |
| 2003/0033491 | A1 * | 2/2003 | Henry et al. .................. | 711/154 |
| 2004/0230760 | A1 * | 11/2004 | Check et al. .................. | 711/168 |
| 2008/0301373 | A1 * | 12/2008 | Harada et al. ................. | 711/133 |

* cited by examiner

*Primary Examiner* — Hal Schnee
(74) *Attorney, Agent, or Firm* — McClure, Qualey & Rodack, LLP

(57) ABSTRACT

A memory accessing method including the following steps is provided. Firstly, two instructions are fetched. Next, the two instructions are respectively decoded to obtain two operation fields and two address fields. The two operation fields indicate the type of operation in accessing the memory. One of the address fields includes a first upper address corresponding to the first memory block and a first lower address corresponding to a first memory unit of the first memory block. The other one of the two address fields includes a second upper address corresponding to the second memory block and a second lower address corresponding to a second memory unit of the second memory block. Then, whether two instructions are performing the same type of operation on the same memory block is determined. If yes, the type of operation indicated by the two operation fields is performed on the corresponding memory block parallelly.

23 Claims, 3 Drawing Sheets

ACCESSING MEMORY WITH IDENTICAL INSTRUCTION TYPES AND CENTRAL PROCESSING UNIT THEREOF

This application claims the benefit of Taiwan application Ser. No. 98112237, filed Apr. 13, 2009, the subject matter of which is incorporated herein by reference.

BACKGROUND OF THE APPLICATION

1. Field of the Application

The application relates in general to methods and devices for accessing a memory and central processing unit using the same.

2. Description of the Related Art

The memory accessing device is a device used for accessing a memory, and is normally implemented by a processor. The instruction set of the processor normally includes many types of instructions such as a read (or load) instruction or a write (or store) instruction. The processor performs different types of operations in accessing the memory according to these instructions. For example, data is read or loaded from the memory, or are written to or stored in the memory according to the above read instruction and write instruction.

The memory accessed by the processor may have many memory blocks each having many memory units. The size of a memory block is called a 'memory word', and the size of a memory unit is denoted in terms of bytes.

However, the memory width of an instruction may differ from one another. For example, the read instruction can be used for reading data with the size of a memory unit, and the write instruction can be used for writing data with the size of four memory units. In other words, when the processor accesses a memory, not every instruction employs the largest memory width, which is referred to as total memory units included in a memory block.

For example, when the processor accesses one of the memory units of a memory block, the processor reads the entire corresponding memory block, and then selects the needed memory unit from the entire memory units of the corresponding memory block. In this example, the processor reads the entire memory block which includes only one requested memory unit and other unnecessary memory units, thereby deteriorating the execution efficiency of the processor in accessing the memory. Thus, how to improve the execution efficiency in accessing the memory is an issue to be resolved in the industry.

SUMMARY OF THE APPLICATION

The application is directed to methods and devices for assessing a memory and central processing unit using the same which is capable of increasing the execution efficiency when accessing the memory.

The application will become apparent from the following detailed description of the preferred but non-limiting embodiments. The following description is made with reference to the accompanying drawings.

DETAILED DESCRIPTION OF THE APPLICATION

Figure 1:
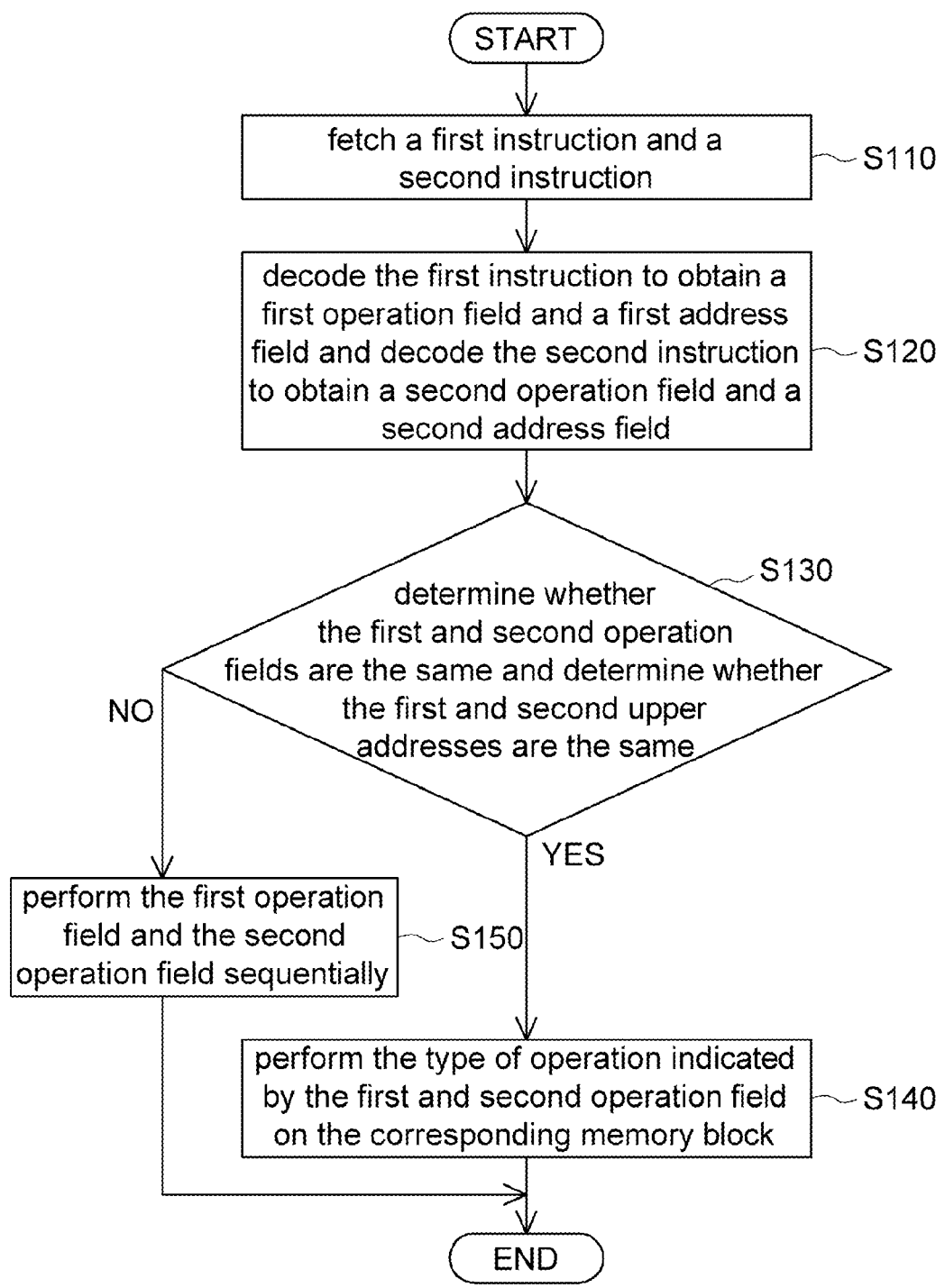
FIG. 1 shows a flowchart of an exemplary embodiment of a memory accessing method.
Figure 2A:
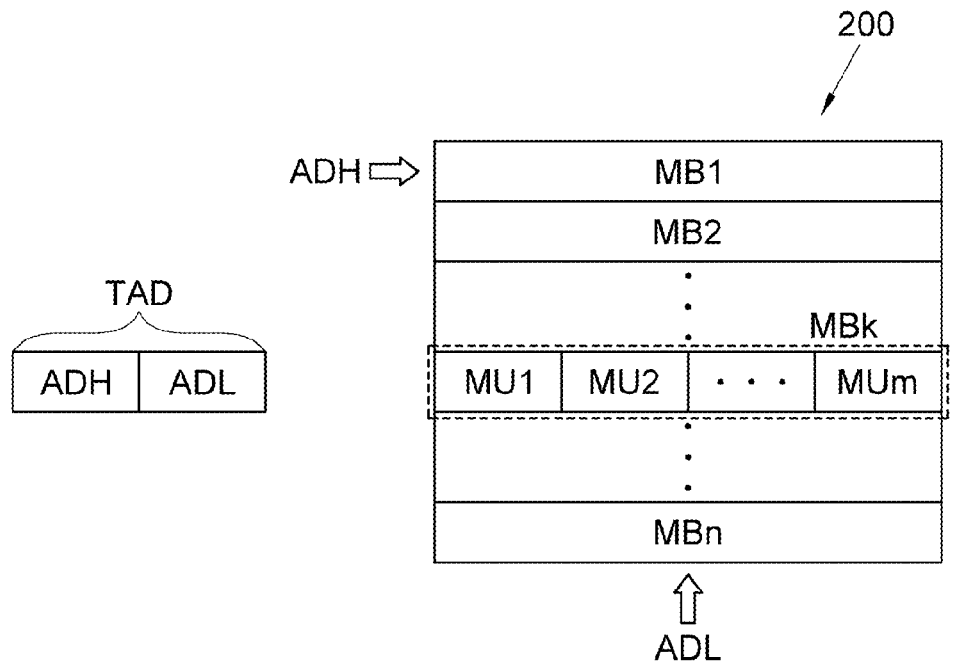
FIG. 2A is a schematic diagram showing an example of a memory used in an embodiment of the application and an address field for locating the memory.

Referring to both FIG. 1 and FIG. 2A. FIG. 1 shows a flowchart of a memory accessing method according to an embodiment of the application. FIG. 2A is a schematic diagram showing an example of a memory 200 used in an embodiment of the application and an address field TAD for locating the memory. The memory accessing method is used for accessing the memory 200.

The memory 200 has many memory blocks MB1~MBn, and each memory block has many memory units MU1~MUm. The size of each of the memory blocks MB1~MBn is denoted in terms of memory word for example, and the size of each of the memory units MU1~MUm is denoted in terms of byte for example. However, this application is not limited thereto.

Locating the memory 200 is performed according to the physical address indicated by the address field TAD. The physical address indicated by the address field TAD includes an upper address ADH and a lower address ADL. The upper address ADH is used for locating the memory blocks MB1~MBn, and the lower address ADL is used for locating the memory units MU1~MUm.

The method includes the following steps. Firstly, the method begins at step S110, a first instruction and a second instruction are fetched. Next, the method proceeds to step S120, in which the first instruction is decoded to obtain a first operation field and a first address field, and the second instruction is decoded to obtain a second operation field and a second address field.

The first operation field and the second operation field indicate the type of operation in accessing the memory 200. The first address field includes a first upper address corresponding to a first memory block and a first lower address corresponding to a first memory unit of the first memory block. The second address field includes a second upper address corresponding to a second memory block and a second lower address corresponding to a second memory unit of the second memory block.

Then, the method proceeds to step S130, whether the first operation field and the second operation field are the same is determined, and whether the first upper address and the second upper address are the same is determined, whereby whether the first instruction and the second instruction are the two instructions performing the same type of operation on the same memory block can thus be determined.

If the first instruction and the second instruction are the two instructions performing the same type of operation on the same memory block, the method proceeds to step S140, the type of operation indicated by the first operation field and the second operation field are performed on the corresponding memory block. If the first instruct and the second instruction aren't the two instruction performing the same type of operation on the same memory block, the method proceeds to step S150, the first operation field and the second operation field are performed sequentially.

In an embodiment, step S140 includes the following sub-steps. The type of operation indicated by the first operation field is performed on the first memory unit according to the first lower address, and the type of operation indicated by the second operation field is performed on the second memory unit according to the second lower address.

Figure 2B:
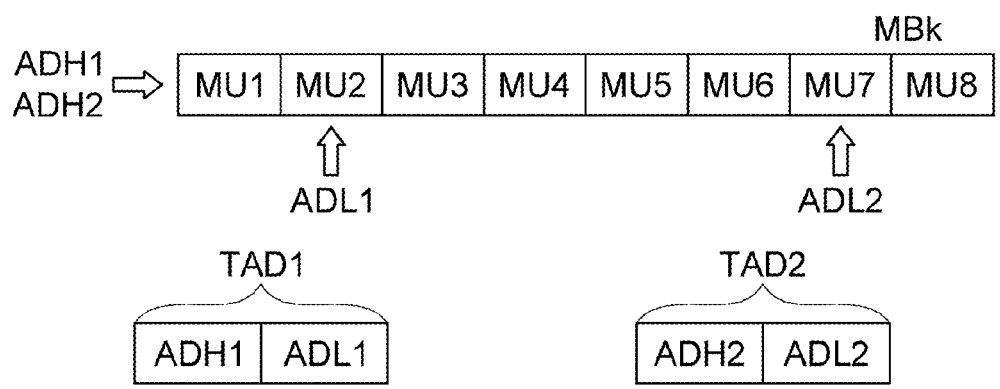
FIG. 2B is a schematic diagram showing an example of a memory block of the memory of FIG. 2A and an two address fields for locating the memory.
Figure 3:
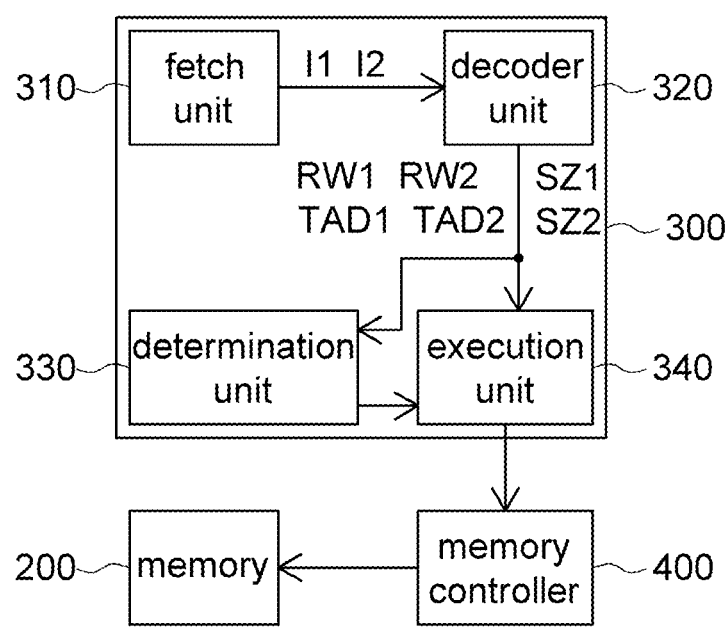
FIG. 3 shows a block diagram of an exemplary embodiment of a memory accessing device using the memory accessing method of FIG. 1.

A memory accessing device applying the memory accessing method of FIG. 1 is provided with different types of operation below for illustration with reference to FIGS. 2B and 3. FIG. 2B is a schematic diagram showing an example of a memory block MBk of the memory 200 of FIG. 2A and two address fields TAD1 and TAD2 for locating the memory 200. FIG. 3 shows a block diagram of a memory accessing device applying the memory accessing method of FIG. 1 according to an embodiment of the application. In an embodiment of the application, each memory block has 8 memory units MU1~MU8 as illustrated in FIG. 2B.

The memory accessing device 300 includes a fetching unit 310, a decoding unit 320, a determining unit 330, and an executing unit 340. The memory accessing device 300 is used for accessing the memory 200. The memory accessing device 300 accesses the memory 200 through a memory controller 400 for example.

The fetching unit 310 is used for fetching a first instruction I1 and a second instruction I2. In an embodiment of the application, assume that the two instructions I1 and I2 are two instructions performing the same type of operation on the same memory block. For example, the same type of operation is performed on the two memory units MU2 and MU7 of memory block MBk of FIG. 2B.

The decoding unit 320 is used for decoding the first instruction I1 to obtain a first operation field RW1, and for decoding the second instruction I2 to obtain a second operation field RW2. The type of operations indicated by the first operation field RW1 and the second operation field RW2 include, for example, read (or load) operation or write (or store) operation.

In an embodiment, when the read operation or the write operation are performed, the decoding unit 320 further decodes the first instruction I1 to obtain a first size field SZ1 and decodes the second instruction I2 to obtain a second size field SZ2.

The decoding unit 320 is further used for decoding the first instruction I1 to obtain the first address field TAD1, and for decoding the second instruction I2 to obtain the second address field TAD2. The first address field TAD1 includes a first upper address ADH1 corresponding to memory block MBk and a first lower address ADL1 corresponding to a memory unit MU2 of the memory block MBk. The second address field TAD2 includes a second upper address ADH2 corresponding to memory block MBk and a second lower address ADL2 corresponding to a memory unit MU7 of the memory block MBk.

The determining unit 330 is used for determining whether the first operation field RW1 and the second operation field RW2 are the same, and for determining whether the first upper address ADH1 and the second upper address ADH2 are the same. In this way, the determining unit 330 can thus determine that whether the first instruction I1 and the second instruction I2 are the two instructions performing the same type of operation on the same memory block. The determining unit 330 can be implemented by a digital logic circuit (such as AND gates and OR gates) or an analog circuit (such as comparers).

If the determining unit 330 determines that the first instruction I1 and the second instruction I2 are the two instructions performing the same type of operation on the same memory block, the executing unit 340 performs the type of operation indicated by the first operation field RW1 and the second operation field RW2 on the corresponding memory block.

In an embodiment, the executing unit 340 uses the memory controller 400 to perform the type of operation indicated by the first operation field RW1 on the memory unit MU2 according to the first lower address ADL1, and to perform the type of operation indicated by the second operation field RW2 on the memory unit MU7 according to the second lower address ADL2.

The read operation and the write operation are respectively exemplified below. In a first example, the type of operation indicated by the first operation field RW1 and the second operation field RW2 can be the read operation.

When the executing unit 340 performs read operation on the memory block MBk, the executing unit 340 uses the memory controller 400 to read the corresponding memory block MBk according to the first upper address ADH1 or the second upper address ADH2. Next, the executing unit 340 starts from the memory unit MU2 to select a first data having the size indicated in the first size field SZ1 according to the first lower address ADL1, and starts from the memory unit MU7 to select a second data having the size indicated in the second size field SZ2 according to the second lower address ADL2.

Description is provided below for comparing the memory accessing device 300 of the application with a conventional memory accessing device. As for the conventional memory accessing device, when executing two read instructions which are requested to read the same memory block, the conventional memory accessing device is required to perform two times of read operation on the memory block to select two pieces of data as the two instructions request, wherein each piece of data is obtained from the memory block during each read operation.

On the other hand, as for the memory accessing device 300 of the application, when the determining unit 330 determines that the two instructions obtained by the fetching unit 310 are the two read instructions performed on the same memory block, the executing unit 340 uses the memory controller 400 to read the memory block, and respectively select two pieces of data from the memory block as the two instructions request.

Thus, compared with the conventional memory accessing device, the memory accessing device 300 of the application can complete the read operation of the two instructions I1 and I2 by reading the corresponding memory block one time, thereby increasing the execution efficiency of the memory accessing device 300.

In a second example, the type of operation indicated by the first operation field RW1 and the second operation field RW2 can be write operation.

When the executing unit 340 performs write operation on the memory block MBk, the executing unit 340 uses the memory controller 400 to locate the corresponding memory block MBk according to the first upper address ADH1 or the second upper address ADH2. Next, the memory controller 400 starts from the memory unit MU2 to write a first data having the size indicated in the first size field SZ1 according to the first lower address ADL1, and starts from the memory unit MU7 to write a second data having the size indicated in the second size field SZ2 according to the second lower address ADL2.

The second example is similar to the first example in that the memory accessing device 300 of the application can also complete the write operation of the two instructions I1 and I2 by locating the corresponding memory block one time, thereby increasing the execution efficiency of the memory accessing device 300.

In the above disclosure, the two instructions I1 and I2 each have three fields, namely, an operation field, an address field, and a size field. However, the application is not limited thereto. In another embodiment, each instruction can include two fields only, such as an operation field and an address field, wherein the lower address of the address field is denoted by way of mask. The mask address field functions as both the lower address and the size field.

Referring to FIG. 2B. Let the instruction I1 be taken for example. Assume that the lower address ADL1 corresponds to the memory unit MU2, and the value of the size field SZ1 is 2. In this regard, using the lower address ADL1 and the size field SZ1 allows the memory controller 400 to start from the memory unit MU2 to read or write two memory units, such as the memory units MU2 and MU3. On the other hand, when the lower address of the address field is denoted by way of mask, the mask address field includes the upper address ADH1, which is the same as the one mentioned above, and further includes a lower mask address. The bit values of the lower mask address, such as a binary code of "01100000", sequentially correspond to the memory units MU1~MU8 of the memory block MBk. Hence, using the mask lower address also allows the memory controller 400 to perform read or write operation on the memory units corresponding to the bit value of "1", such as the memory units MU2 and MU3 in this example.

Referring to FIGS. 2B and 3. Let the two instructions I1 and I2 be used for performing the same type of operation on the same memory block MBk. If the first lower address ADL1 and the second lower address ADL2 are both denoted by way of mask, then the decoding unit 320 does not decode the two instructions I1 to obtain the two size fields SZ1 and SZ1. Moreover, when executing unit 340 uses the memory controller 400 to perform the type of operation indicated by the first operation field I1 and the second operation field I2 on the corresponding memory block MBk according to the bit value indicated by the first lower address ADL1, and perform the type of operation indicated by the first operation field RW1 and the second operation field RW2 on the corresponding memory block MBk according to the bit value indicated by the second lower address ADL2.

Although the lower mask address is denoted in a way different from that of the above lower address ADL1, with a determination of whether the two instructions I1 and I2 have identical operation fields and upper addresses, the determining unit 330 can also enable memory accessing device 300 to complete the read or write operation of the two instructions I1 and I2 at one time.

The operation of the memory accessing device 300 of the present embodiment of the application is exemplified by the read operation and the write operation. However, the above exemplification is for elaborating the application only, and the application is not limited thereto. Moreover, in the present embodiment of the application, the instructions used by the memory accessing device may include three fields (that is, an operation field, an address field, and a size field), or include two fields (that is, an operation field and an address field), which is provided as examples for elaboration without any intend of limitation. Any approach, which decodes the upper address of the address field and the operation field from the instruction while determines whether the two instructions have the same operation field and the same upper address, is regarded as a practicable embodiment of the application.

Moreover, the fetching unit 310 is exemplified as being used for fetching two instructions I1 and I2. However, the application is not limited thereto. The fetching unit 310 can also fetch three or more than three instructions, and further determine whether these instructions perform the same operation on the same memory block. Thus, the present embodiment of the application can also complete the read or write operation of the instructions at one time. The present embodiment of the application can combine many (two or more than two) instructions to access a memory.

The memory accessing device 300 of the application can be implemented by a processor capable of processing at least two instructions in parallel, such as a superscalar processor. As such, the fetching unit 310 can fetch the first instruction I1 and the second instruction I2 in parallel, and the decoding unit 320 can decode the first instruction I1 and the second instruction I2 in parallel. After that, the determining unit 330 can promptly determine whether the first instruction I1 and the second instruction I2 are the two instructions performing the operation on the same memory block MBk.

The memory accessing device 300 of the application can be used in a central processing unit (CPU), and the memory 200 is a flash memory for example. The flash memory and the memory controller 400 can be disposed on the inside of the CPU. Thus, when the CPU performs the memory accessing method of the application, the execution efficiency of accessing the flash memory is improved.

According to the memory accessing method, the memory accessing device and the CPU using the same disclosed in the above embodiments of the application, it is disclosed to identify fetched instructions as the ones for performing the same type of operation on the same memory block by determining whether the two operation fields of two decoded instructions are the same is determined, and determining whether the upper address of the two address fields of two decoded instructions are the same. If yes, corresponding operation is performed on the memory block so as to improve the execution efficiency of accessing the memory.

While the application has been described by way of example and in terms of a preferred embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for accessing a memory, wherein the memory has a plurality of memory blocks each having a plurality of memory units, the method comprising:

fetching, at least, a first instruction and a second instruction;

decoding the first instruction to obtain a first operation field and a first address field, and decoding the second instruction to obtain a second operation field and a second address field, wherein each of the first operation field and the second operation field indicates a type of operation for accessing the memory, the first address field comprises a first upper address corresponding to a first memory block and a first lower address corresponding to a first memory unit of the first memory block, and the second address field comprises a second upper address corresponding to a second memory block and a second lower address corresponding to a second memory unit of the second memory block;

determining whether the first instruction and the second instruction are two instructions performing a same type of operation on a same memory block; and performing the type of operation indicated by the first operation field and the second operation field on the corresponding memory block if the first instruction and the second instruction are the two instructions performing the same type of operation on the same memory block;

wherein the first instruction and the second instruction are executed only after the determination of whether the first instruction and the second instruction are two instructions performing the same type of operation on the same memory block.

2. The method according to claim 1, wherein the step of determining whether the first instruction and the second instruction are the two instructions performing the same type of operation on the same memory block comprises:

determining whether the first operation field and the second operation field are the same; and determining whether the first upper address and the second upper address are the same.

3. The method according to claim 1, wherein the step of performing the type of operation indicated by the first operation field and the second operation field comprises:

performing the type of operation indicated by the first operation field on the first memory unit according to the first lower address; and performing the type of operation indicated by the second operation field on the second memory unit according to the second lower address.

4. The method according to claim 3, wherein if the type of operations indicated by the second operation field and the first operation field are read operations, the method further comprises:

decoding the first instruction to obtain a first size field and decoding the second instruction to obtain a second size field;

wherein the step of performing the type of operation indicated by the first operation field and the second operation field comprises:

reading the corresponding memory block according to the first upper address or the second upper address;

starting from the first memory unit to select a first data having a size indicated in the first size field; and starting from the second memory unit to select a second data having a size indicated in the second size field.

5. The method according to claim 3, wherein if the type of operations indicated by the second operation field are write operations, the method further comprises:

decoding the first instruction to obtain a first size field and decoding the second instruction to obtain a second size field;

wherein the step of performing the type of operation indicated by the first operation field and the second operation field comprises:

locating the corresponding memory block according to the first upper address or the second upper address;

starting from the first memory unit to write a first data having a size indicated in the first size field; and starting from the second memory unit to write a second data having a size indicated in the second size field.

6. The method according to claim 1, wherein the first lower address and the second lower address are denoted by a way of mask, and the step of performing the type of operation indicated by the first operation field and the second operation field comprises:

performing the type of operation indicated by the first operation field and the second operation field on the corresponding memory block according to a bit value indicated by the first lower address; and performing the type of operation indicated by the first operation field and the second operation field on the corresponding memory block according to a bit value indicated by the second lower address.

7. The method according to claim 1, wherein the two steps of fetching and decoding the first instruction and the second instruction respectively comprise:

fetching the first instruction and the second instruction parallelly; and decoding the first instruction and the second instruction parallelly.

8. The method according to claim 1, being utilized in a processor capable of processing at least two instructions parallelly.

9. The method according to claim 1, wherein the memory is a flash memory.

10. A device for accessing a memory, wherein the memory has a plurality of memory blocks each having a plurality of memory units, the device comprising:

a fetching unit for fetching at least a first instruction and a second instruction;

a decoding unit for decoding the first instruction to obtain a first operation field and a first address field and decoding the second instruction to obtain a second operation field and a second address field, wherein each of the first operation field and the second operation field indicates a type of operation for accessing the memory, the first address field comprises a first upper address corresponding to a first memory block and a first lower address corresponding to a first memory unit of the first memory block, and the second address field comprises a second upper address corresponding to a second memory block and a second lower address corresponding to a second memory unit of the second memory block;

a determining unit for determining whether the first instruction and the second instruction are two instructions performing a same type of operation on a same memory block; and an executing unit for performing the type of operation indicated by the first operation field and the second operation field on the corresponding memory block if the determining unit determines that the first instruction and the second instruction are the two instructions performing the same type of operation on the same memory block;

wherein the first instruction and the second instruction are executed only after the determination of whether the first instruction and the second instruction are two instructions performing the same type of operation on the same memory block.

11. The device according to claim 10, wherein the determining unit determines whether the first operation field and the second operation field are the same and determines whether the first upper address and the second upper address are the same.

12. The device according to claim 10, wherein when the executing unit performs the type of operation indicated by the first operation field and the second operation field, the executing unit performs the type of operation indicated by the first operation field on the first memory unit according to the first lower address, and performs the type of operation indicated by the second operation field on the second memory unit according to the second lower address.

13. The device according to claim 12 for accessing the memory through a memory controller, wherein the type of operations indicated by the first operation field and the second operation field are read operations, and the decoding unit decodes the first instruction to obtain a first size field and decodes the second instruction to obtain a second size field;

wherein, when the executing unit performs the type of operation indicated by the first operation field or the second operation field, the executing unit uses the memory controller to read the corresponding memory block according to the first upper address or the second upper address, and the executing unit starts from the first memory unit to select a first data having a size indicated in the first size field and starts from the second memory unit to select a second data having a size indicated in the second size field.

14. The device according to claim 12 for accessing the memory through a memory controller,
wherein the first operation field and the type of operation indicated by the second operation field are write operations, and the decoding unit decodes the first instruction to obtain a first size field and decodes the second instruction to obtain a second size field;
wherein, when the executing unit performs the type of operation indicated by the first operation field and the second operation field, the executing unit uses the memory controller to locate the corresponding memory block according to the first upper address and the second upper address, and the memory controller starts from the first memory unit to write a first data having a size indicated in the first size field, and starts from the second memory unit to write a second data having a size indicated in the second size field.

15. The device according to claim 10 for accessing the memory through a memory controller, wherein the first lower address and the second lower address are denoted by a way of mask, and when the executing unit performs the type of operation indicated by the first operation field and the second operation field, the executing unit uses the memory controller to perform the type of operation indicated by the first operation field and the second operation field on the corresponding memory block according to a bit value indicated by the first lower address, and to perform the type of operation indicated by the first operation field and the second operation field on the corresponding memory block according to a bit value indicated by the second lower address.

16. The device according to claim 10, wherein the fetching unit is used for fetching the first instruction and the second instruction parallelly, and the decoding unit is used for decoding the first instruction and the second instruction parallelly.

17. The device according to claim 10, being implemented by a processor capable of processing at least two instructions parallelly.

18. The device according to claim 10, wherein the memory is a flash memory.

19. A central processing unit (CPU), comprising:
a memory having a plurality of memory blocks each having a plurality of memory units; and
a memory accessing device for accessing the memory, wherein the memory accessing device comprises:
a fetching unit for fetching at least a first instruction and a second instruction;
a decoding unit for decoding the first instruction to obtain a first operation field and a first address field and decoding the second instruction to obtain a second operation field and a second address field, wherein each of the first operation field and the second operation field indicates a type of operation for accessing the memory, the first address field comprises a first upper address corresponding to a first memory block and a first lower address corresponding to a first memory unit of the first memory block, and the second address field comprises a second upper address corresponding to a second memory block and a second lower address corresponding to a second memory unit of the second memory block;
a determining unit for determining whether the first instruction and the second instruction are two instructions performing a same type of operation on a same memory block; and
an executing unit for performing, if the first instruction and the second instruction are the two instructions performing the same type of operation on the same memory block, the type of operation indicated by the first operation field and the second operation field on the same memory block;
wherein the first instruction and the second instruction are executed only after the determination of whether the first instruction and the second instruction are two instructions performing the same type of operation on the same memory block.

20. The CPU according to claim 19, wherein the determining unit is utilized for determining whether the first operation field and the second operation field are the same and determining whether the first upper address and the second upper address are the same.

21. The CPU according to claim 19, further comprising:
a memory controller, wherein the memory accessing device accesses the memory through the memory controller;
wherein when the executing unit performs the type of operation indicated by the first operation field or the second operation field, the executing unit uses the memory controller to perform the type of operation indicated by the first operation field on the first memory unit and, and to perform the type of operation indicated by the second operation field on the second memory unit.

22. The CPU according to claim 19, wherein the memory is a flash memory.

23. The CPU according to claim 19, wherein the CPU is implemented by a processor capable of processing at least two instructions parallelly.

* * * * *